United States Patent [19]
Owen

[11] Patent Number: 5,483,595
[45] Date of Patent: Jan. 9, 1996

[54] PAGING DEVICE INCLUDING PASSWORD ACCESSED STORED CRYPTOGRAPHIC KEYS

[75] Inventor: Jeffrey R. Owen, Portland, Oreg.

[73] Assignee: Seiko Communications Holding N.V., Netherlands Antilles

[21] Appl. No.: 410,640

[22] Filed: Mar. 21, 1995

Related U.S. Application Data

[63] Continuation of Ser. No. 124,316, Sep. 20, 1993, abandoned.

[51] Int. Cl.$^6$ .................................................. H04K 1/00
[52] U.S. Cl. ........................ 380/23; 380/49; 340/825.44; 340/311.1
[58] Field of Search .................................. 380/9, 23, 36, 380/37, 41, 42, 49, 50, 52, 53; 340/311.11, 825.44

[56] References Cited

U.S. PATENT DOCUMENTS

| | | | |
|---|---|---|---|
| 4,783,654 | 11/1988 | Ichikawa | 340/825.44 |
| 5,146,217 | 9/1992 | Holmes et al. | |
| 5,150,954 | 9/1992 | Hoff | 340/825.44 |
| 5,241,599 | 8/1993 | Bellovin et al. | 380/42 X |
| 5,283,832 | 2/1994 | Lockhart, Jr. et al. | 380/49 |
| 5,285,496 | 2/1994 | Frank et al. | 380/9 |
| 5,294,922 | 3/1994 | Akahori | 340/825.44 |

FOREIGN PATENT DOCUMENTS

| | | | |
|---|---|---|---|
| 4-127725 | 4/1992 | Japan | 380/9 |
| 2155676 | 9/1985 | United Kingdom | 340/825.44 |

*Primary Examiner*—Tod R. Swann
*Attorney, Agent, or Firm*—Elmer Galbi

[57] ABSTRACT

A paging device includes a cryptographic function and a password accessed cryptographic key look-up table associating each stored key with a password. When an cryptographic message is collected by the paging device, the user can select a relatively long cryptographic key by entering a relatively shorter password. The paging device then applies a cryptographic function to a received message using a selected relatively long cryptographic key, the selection being a function of user entry of a relatively short password. Overall, paging messages in transit, i.e., while broadcast by radio signal, enjoy a high level of security by encryption with a relatively long cryptographic key by a message source. As accessed by the user, however, the cryptographic messages are reviewed in readable form by use of a relatively short password designating a relatively long stored cryptographic key.

3 Claims, 7 Drawing Sheets

"RCVR_ID" , "MSG$_0$,MSG$_1$...ESC_MARKER ... MSG$_n^*$ ...   FIG. 5A

PAGING DEVICE INCLUDING PASSWORD ACCESSED STORED CRYPTOGRAPHIC KEYS

This application is a continuation of application Ser. No. 08/124,316, filed Sep. 20, 1993 which is now abandoned.

BACKGROUND OF THE INVENTION

The invention relates generally to communication devices, and particularly to paging devices including cryptographic messages and paging device management thereof.

Paging devices are evolving into information terminals, providing more than merely a "beep" or a telephone number to be called in response to the page. In particular, paging devices can display alpha-numeric pages bearing a variety of messages. Also, by prearrangement with a message source, meaningful information can be encoded into the form of a telephone number or given pattern of digit presentation to convey, by such prearrangement, meaningful information beyond a telephone number to called. Security with respect to information delivered to a paging device is desirable because paging devices can receive for display and storage confidential information, e.g., bank account balance information or a variety of other information the receiver considers confidential.

Security with respect to message display and device access in a paging device has been proposed wherein the user enters a password before the paging device displays certain designated messages, or before the device exits a "lockout" mode. For example, see U.S. Pat. No. 5,146,217 issued Sep. 8, 1992 to Holmes et al and entitled SELECTIVE CALL RECEIVER HAVING CONFIDENTIAL MESSAGE READ PROTECTION. Unfortunately, such arrangement does not protect the confidentiality of messages when broadcast by radio signal to the paging device. By modifying radio receiving and data processing equipment to match the broadcast protocol of a given paging system, an adversary can simply eavesdrop on the radio signal broadcast and obtain confidential information.

Paging devices are generally small, miniaturized radio receiving devices including, to the extent possible in such miniaturized devices, certain user interface resources, e.g., a display and several control buttons. Unfortunately, such control buttons are generally a limited resource in a miniaturized paging device. For example, paging devices have been successfully miniaturized into the form of a wristwatch paging device. Under such extreme miniaturization, few control buttons are practical. Accordingly, requiring that the user engage in complex user interface activity becomes unacceptable with limited control button resources. As may be appreciated, any features added to a paging device should make the most efficient use possible of existing paging device resources, and preferably not require additional device resources.

The subject matter of the present invention addresses the problem of security in a paging system by providing a mechanism for secure message transmission and management with low user interface overhead allowing implementation with limited control button resources.

SUMMARY OF THE INVENTION

In accordance with the present invention, a message source can deliver to the user of a paging device cryptographic messages. The paging device includes a cryptographic function and a table of user created passwords each in association with a cryptographic key. The user applies a message and a selected cryptographic key to the cryptographic function to decrypt and display the message provided by the message source. Because the user must provide a password to obtain access to the cryptographic key, unauthorized use of the paging device to review cryptographically secure messages is prevented. Because the messages can be encrypted against very long keys, the message in transmission enjoys a high degree of security, but the user need not enter such long keys to decrypt the messages so long as the user has the appropriate password to obtain access to a stored copy of the required cryptographic key.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
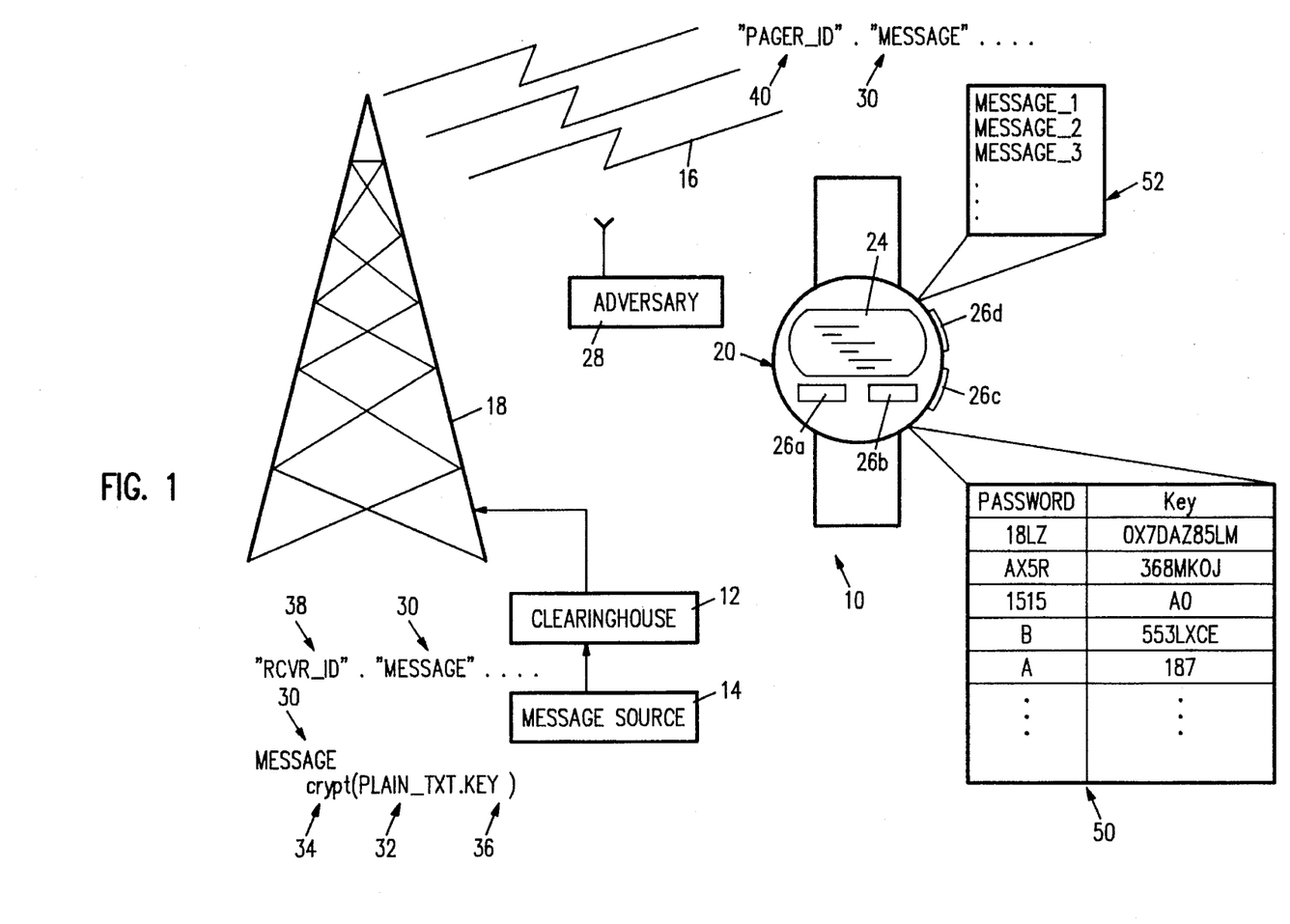
FIG. 1 illustrates a sending message source and a receiving paging device communicating confidentially by way of a paging system with an adversary monitoring the radio broadcast of paging information.

FIG. 1 illustrates generally a paging system 10 including a clearinghouse 12 receiving paging messages from message source 14 and producing a radio signal broadcast 16 by way of transmission facilities 18. A plurality of paging devices 20, one being shown in FIG. 1, operate within the radio signal broadcast 16 and receive paging messages by way of system 10. Each paging device 20 includes a display 24 and control buttons 26, individually 26a–26d. As may be appreciated, each paging device 20 includes processing components and hardware resources for receiving information from radio signal 16 according to a given paging system 10 protocol, monitoring user manipulation of buttons 26, and presenting information on display 24 according to device 20 programming.

Also illustrated in FIG. 1, an adversary 28 operating within paging system 10 monitors radio signal 16 with sufficient knowledge of system 10 protocol to collect and analyze data from radio signal 16. Furthermore, adversary 28 can, with relatively common knowledge and equipment, collect an entire stream of broadcast information and analyze items addressed to a given paging device 20. Thus, all messages sent to a given paging device 20 could be collected and reviewed by adversary 28.

In accordance with the present invention, however, message source 14 submits cryptographic information to clearinghouse 12 for broadcast in the radio signal 16. Clearinghouse 12 handles the cryptographic message as any other message, there being no need for special handling or manipulation by clearinghouse 12.

Message source 14 has sufficient processing ability to produce the cryptographic message string 30 by applying a readable text string 32 and a chosen key 36 to a cryptographic function 34. As may be appreciated, message source 14 must provide to function 34 a designated cryptographic key 36. Once message string 30 is produced, message source 14 submits message string 30 along with a receiver identification string 38 to clearinghouse 12. In particular, message source 14 establishes a modem/data link with clearinghouse 12 for the purpose of direct message submission according to a given paging message submission convention. For example, one defacto standard is known as the Personal Communications Industry Association "Telocator Alpha Protocol" (TAP).

Clearinghouse 12 uses the receiver identification string 38 to designate one of paging devices 20, specified by a PAGER_ID 40. Thus, radio signal 16 provides in association PAGER_ID 40 and message string 30 according to a paging system 10 transmission protocol. Paging devices 20 then use the PAGER_ID 40 as a basis for accepting or declining message 30. As may be appreciated, the broadcast signal 16 would include additional information in association with the PAGER_ID 40 and message 30, e.g., error correcting codes, but not relevant to the present discussion.

As may be appreciated, if a message 30 arrives at a paging device 20 in cryptographic form, device 20 should have a decryption function and key corresponding to the encryption function and key used by originating message source 14. Furthermore, each paging device 20 user must somehow apply the cryptographic function and key. For greater security, longer cryptographic keys are required. Unfortunately, the highly miniaturized wristwatch pager 20 offers few opportunities for user interface. In particular, the display 24 and control buttons 26a–26d are a limited resource, and severely limit entry of complex information, i.e., entry of long keys.

In accordance with the present invention, however, each paging device 20 includes a password accessed cryptographic key table 50. Table 50 associates short passwords with relatively longer cryptographic keys. The user of paging device 20 can more easily enter a short password, yet have access to a much longer key. Such keys may be selectively applied to incoming messages or to messages previously stored in message buffer 52. Accordingly, radio signal transmission 16 enjoys the relatively high security of a message 30 being encrypted with a relatively long encryption key. The user of paging device 20, however, enjoys convenient access to a readable version of message 30 by entering a relatively short password. Thus, the present invention allows a high level of security in transmission of confidential messages, but reduces overhead of manipulation of small, miniaturized paging devices with limited data entry and control button resources. As the data is exposed to adversary 28, the message 30 enjoys high security, yet such high security does not present significant encumbrance with respect to paging device 20 user interface access.

As may be appreciated, the cryptographic key used by paging device 20 must correspond in some fashion to the cryptographic key 36 used in the production of message 30. Cryptographic algorithms and key schemes are widely varied. As such cryptology applies to the present invention, a variety of methods may be employed, so long as appropriate prearrangements are made between the user of paging device 20 the operator of message source 14 to ensure use of appropriate encryption and decryption functions and keys. For the present discussion, any functions which are described as cryptographic, typically a function "crypt", shall refer to a given encryption or decryption algorithm used according to prearrangement between the user of paging device 20 and the operator of message source 14. Also, as used herein the term "text" shall generally refer to the result of applying a given message string to a cryptographic function of the paging device. Such text may or may not be readable, depending on the selection of cryptographic key used. Also, as will be more fully apparent hereafter, the user of paging device 20 can apply a given message several times to a cryptographic function, with intermediate "text" results being selectively stored as messages in the message buffer 52 of paging device 20.

The cryptographic function employed by paging device 20 can take a variety of forms. Also, a variety of enhancements may be provided to increase security provided to messages stored in the paging device 20. Consider, for example, a paging device 20 lost or stolen and manipulated by an unauthorized user. The unauthorized user could by trial and error attempt to enter passwords to gain access to the stored cryptographic keys. To provide as few clues as possible as to the validity of a password, it is suggested that the paging device 20 be programmed in its key access procedure to respond to entry of invalid passwords, i.e., a password not appearing in table 50, by selecting a pseudorandom cryptographic key and providing to the unauthorized user what appears to be an alternate version of the paging message. Furthermore, the pseudorandom cryptographic key selected by paging device 20 could be a function of the invalid password and the paging device identification number, i.e., PAGER_ID 40. In this manner, the unauthorized user generates the same cryptographic key and sees the same result upon repeated entry of the invalid password. Thus, the unauthorized user cannot distinguish between valid passwords, i.e., passwords contained in table 50, and invalid passwords, i.e., passwords not contained in table 50. This arrangement makes it more difficult for the unauthorized user to identify valid passwords, and therefore more difficult to gain access to cryptographic keys and secure information stored in paging device 20. A second enhancement which may be provided to the cryptographic function of paging device 20 permits the user to enter a single digit, e.g., single zero value digit, as a password. In response, the programming of paging device 20 skips any cryptographic function and returns the original message. This provides the device 20 with an "abort" feature selected by entry of a simple single digit password. While the above two enhancements to the cryptographic function improve security and ease of use, these features will not be specifically shown in the drawings. It will be understood, however, that such features would be incorporated into the cryptographic function of paging device 20 by appropriate programming by one of ordinary skill in the relevant art.

Figure 2A:
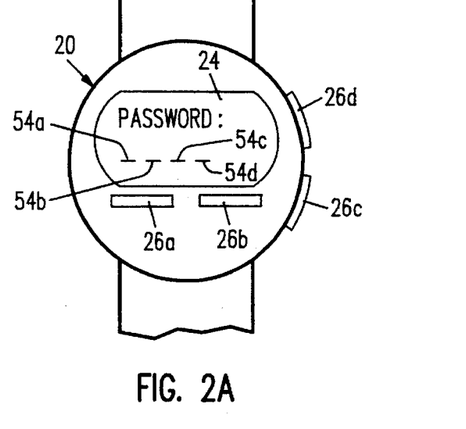
FIGS. 2A and 2B illustrate display screens and a method for creating a password accessed cryptographic key table used by the receiving paging device of FIG. 1 in accordance with the present invention.
Figure 2B:
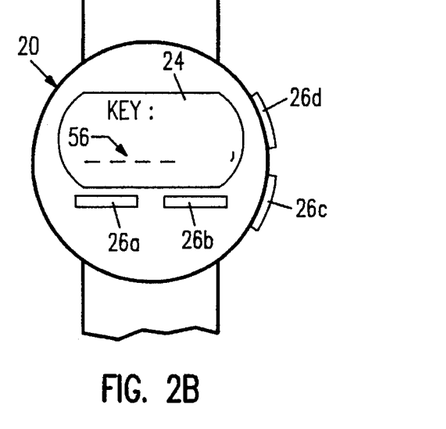

FIGS. 2A and 2B illustrate use of display screen 24 and control buttons 26 to create entries for the table 50 of FIG. 1. Upon entering a routine to create a new entry for table 50, display 24 presents the prompt "password:" and provides alpha-numeric digit locations 54, individually 54a–54d. Beginning at digit location 54a, paging device 20 cycles through a given set of available digit value selections, e.g., alpha-numeric characters, in response to activation of control button 26a. Once the user establishes a digit value selection for digit 54a, pressing control button 26b sets that value for location 54a, and moves digit selection to digit 54b. The process continues from digit to digit until the user of paging device 20 has provided a complete password indicated by pressing control button 26c. As may be appreciated, passwords can vary in length. Short single digit passwords are most convenient for access to the stored cryptographic keys. Thus, if the primary concern for security is with respect to exposure during transmission of the message by radio signal, shorter single digit passwords may be used for their ease of entry and memorization. If, however, security against a lost or stolen paging device 20 is a concern, then it is suggested that longer passwords be employed to make more difficult access to the stored cryptographic keys. In any case, the user defines the password length and content.

FIG. 2B illustrates a similar user interface following password entry wherein paging device 20 presents on display 24 the prompt "KEY:" and provides a sequence of digit locations 56. As may be appreciated, the key value would likely be a large number of digits, e.g., potentially as long as a message string. Accordingly, digit locations 56 would likely scroll across display 24 to allow entry of a large number of digits to establish a cryptographic key value. Once the password and cryptographic key are established as indicated in FIGS. 2A and 2B, the values are stored in association in table 50 for use against messages at the time of receipt, or for use against previously received messages as stored in message buffer 52.

Figure 3:
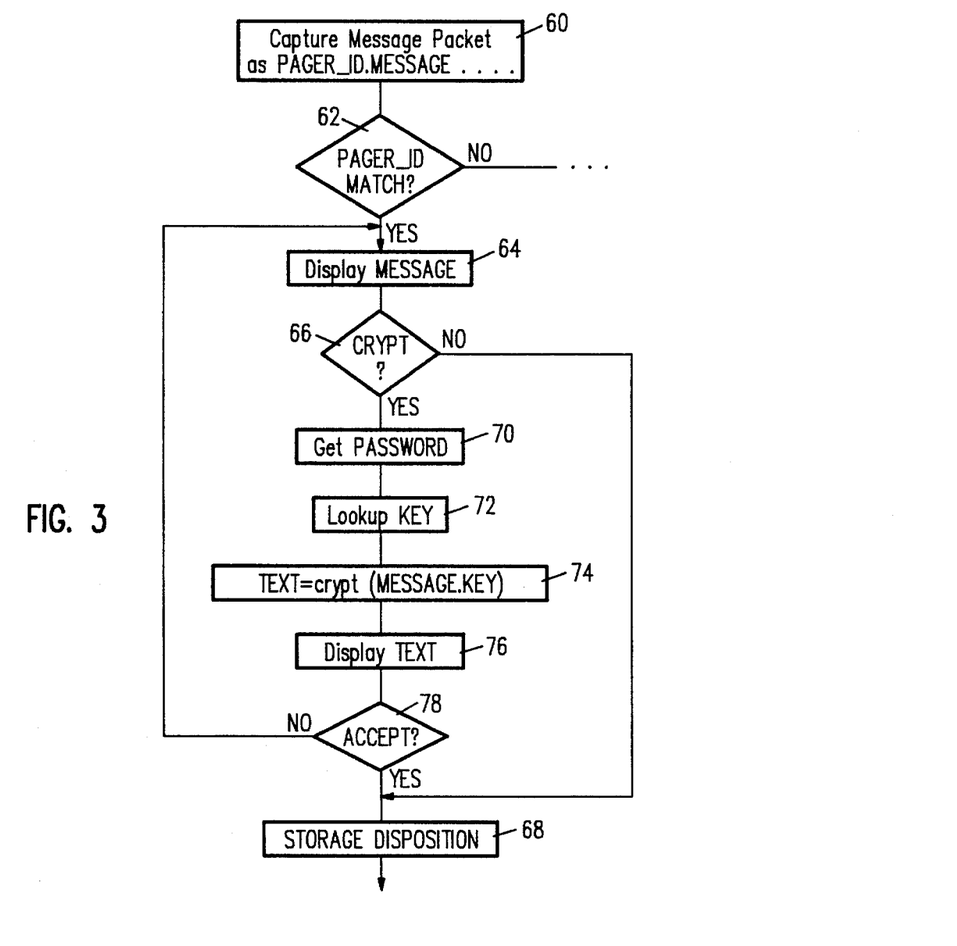
FIG. 3 is a flow chart illustrating programming of the paging device of FIG. 1 allowing the user to selectively apply a cryptographic function to a newly arrived message.
Figures 4, 5A:
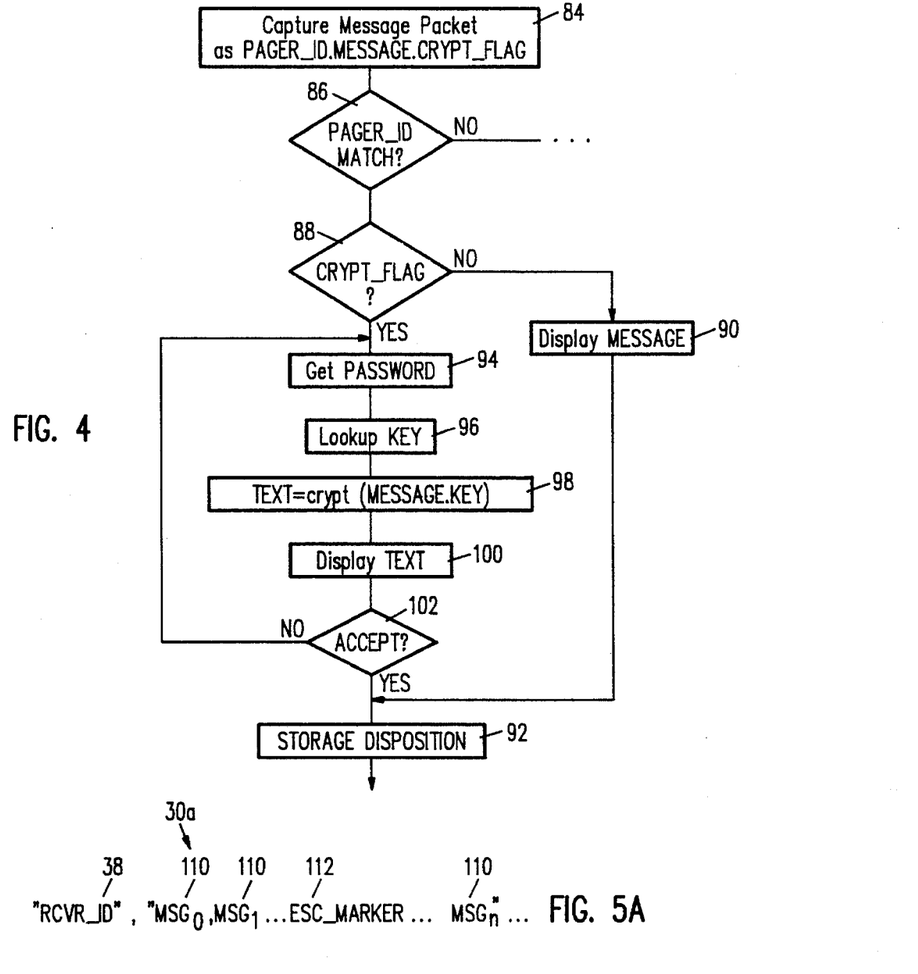
FIG. 4 is a flow chart illustrating programming of the paging device of FIG. 1 allowing the paging device to detect need for a cryptographic function and allow the user to selectively apply a cryptographic function to a newly arrived message.
FIG. 5A illustrates a method of indicating need for a cryptographic function relative to a portion of a paging message string.

FIGS. 3 and 4 illustrate programming of paging device 20 relative to newly arrived messages, including selective decryption and storage of newly arrived messages. FIG. 3 illustrates a first embodiment of the present invention wherein the user of paging device 20 inspects a given message when displayed and selectively applies a cryptographic function thereto. FIG. 4 illustrates a second embodiment wherein the paging system protocol includes a flag indicating a message including cryptographic material and paging device 20 reacts to the flag by presenting automatically the cryptographic function.

In FIG. 3, a procedure associated with the capture of a message packet is illustrated. The programming illustrated in FIG. 3 assumes that the user of paging device 20 will immediately respond to capture of a message packet, i.e., engage in interaction with paging device 20 in response to a paging alert associate with capture of a new message. Additional programming beyond that illustrated in FIG. 3 could deal with a situation where a message is captured, but the user is not available to process the newly arrived message as illustrated in FIG. 3. Accordingly, a mechanism should be provided for stacking newly arrived messages and permitting processing as illustrated in FIG. 3 for each stacked newly arrived message. Alternatively, if a newly arrived message is not processed by the user within a given time of receipt, the newly arrived message could simply be placed in message buffer 52, and later selectively applied to the cryptographic function as a stored message in the manner discussed more fully hereinafter.

In processing block 60, paging device 20 activates its radio receiving circuitry and captures a message packet according to system 10 protocol and, after appropriate error detection and correction algorithms have been applied, obtains a PAGER_ID and message string MESSAGE. In decision block 62, paging device 20 compares the captured PAGER_ID with its unique identification number. If no match occurs, then the message packet is discarded and processing branches to other unrelated programming. If a match does occur, however, then the captured MESSAGE is intended for this particular paging device 20 and processing advances to block 64 where the MESSAGE is displayed for user review. Also in block 64, paging device 20 might activate an audible alarm to indicate to the user that a message has recently arrived and is presented on display 24. In decision block 66, the user indicates in some fashion whether or not a cryptographic function is to be applied to MESSAGE as currently presented on display 24. If no such cryptographic function is to be applied, then processing advances to block 68 where a given storage disposition procedure for MESSAGE is executed. For example, such storage disposition could include opportunity for the user to store the message either as an encrypted message or decrypted text, or not store the message in any form.

If the user does wish to apply a cryptographic function, then processing advances from block 66 to block 70 where paging device 20 obtains from the user a password. For example, a screen similar to that presented in FIG. 2A provides opportunity to enter a given password. Continuing to block 72, paging device 20 uses the just entered password to access table 50 and select a corresponding cryptographic key. As may be appreciated, processing block 72 might include certain error handling routines in the event that the user enters a password not found in table 50. Such error handling routines could include an exit path (not shown in FIG. 3) as an abort option when, for example, a single digit zero value password is selected. Also, the programming of paging device 20 could include selection of a pseudorandom cryptographic key, possibly as a function of the provided password and paging device serial number, as a mechanism for providing no clue for distinguishing valid passwords, i.e., those found in table 50, and invalid passwords, i.e., not found in table 50. In any event, once the user has specified a key, paging device 20 applies that key to the message according to a given cryptographic function in block 74 to obtain an alternate version of the message, designated TEXT in FIG. 3. In block 76, the text message is presented on display 24. Moving to decision block 78, the user can accept or decline the text message, i.e., by appropriate manipulation of control buttons 26. If the user accepts the text message displayed, then processing advances to block 68 where a given storage disposition procedure is executed.

If, however, the user does not accept the displayed text message at decision block 78, e.g., because it is not readable, then processing returns to block 64 where paging device 20 again displays MESSAGE as originally captured. The process continues until the user finally accepts a text display at decision block 78. In particular, a meaningful display appears in block 76 when the user enters the password associated with a cryptographic key corresponding to the particular key, e.g., key 36, used by message source 14.

The procedure proposed in FIG. 3 requires that the user of paging device 10 rely on inspection of the displayed message as a basis for determining that a cryptographic function need be applied. Thus, the user may, if necessary, employ trial and error tactics until the displayed message is meaningful. Also, the user may have some expectation as to the particular message source, and could, as a function of such expectation, select a particular one of the passwords of table 50 rather than employ trial and error tactics.

FIG. 4 illustrates an alternative embodiment of the present invention wherein the message source 14 includes in the data submission to clearinghouse 12 an indication that message 30 is in some fashion encrypted. For example, additional fields in the "Telocator" protocol would be used for this purpose. In response, clearinghouse 12 prepares a message packet for transmission in radio signal 16 including in addition to PAGER_ID 40 and message 30, a flag indicating that the message 30 is in some fashion encrypted. In FIG. 4, paging device 20 captures in block 84 a message packet and obtains a PAGER_ID, a message string MESSAGE, and a flag CRYPT_FLAG. In decision block 86, paging device 20 compares its unique identification with the captured PAGER_ID. If no match occurs, then processing branches to unrelated programming. If a match does occur, then processing advances to decision block 88 where paging device 10 interrogates the flag CRYPT_FLAG. If the flag indicates no encryption of the captured message, then, in block 90, MESSAGE appears on display 24 and processing continues to storage disposition block 92.

If, however, the flag indicates MESSAGE is encrypted, then processing advances to block 94 where the user is prompted for a password. Continuing to block 96, the password obtained from the user is used to collect a given cryptographic key from table 50. In block 98, paging device 20 obtains a text version of the message by applying MESSAGE and the collected key to a cryptographic function. The user then has opportunity in decision block 102 to accept or decline the displayed text message. If the user declines, then processing returns to block 94 where the user selects another password, and therefore another cryptographic key, for obtaining another text version of the captured message. When the user does accept a text display in decision block 102, then processing advances to decision block 92 where a given storage disposition procedure is executed.

The next embodiment of the present invention provides a basis for selecting one of the passwords in table 50, rather than select a given password by trial and error or based on some expectation of message delivery from a given source.

FIG. 5A illustrates a receiver identification 38 and message 30a delivered by message source 14 to clearinghouse 12. Message 30a differs from the previously described message 30 in that it includes in addition to a sequence of message characters 110, an escape marker 112. Escape marker 112 provides a basis for bifurcating message 30a into a portion to be ignored by the cryptographic function and a portion requiring application to the cryptographic function. Such escape sequence methods can take a variety of forms. For example, the escape marker could simply divide the message such that characters preceding the marker are ignored and those characters following the marker are applied to the cryptographic function. Alternatively, the escape marker 112 could include not only an initial escape character, but could also be followed by a datum indicating the number of characters following the datum of a given designation, e.g., number of characters to be applied to the cryptographic function. For the present discussion, it will be understood that an escape sequence of some form can be used to designate portions of message 30a as being either to be ignored or to be applied to the cryptographic function.

Figure 5B:
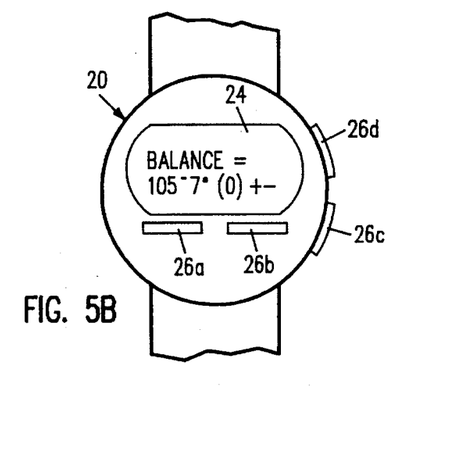
FIGS. 5B and 5C are screen displays illustrating use of partial encryption and decryption relative to a paging message string.
Figure 5C:
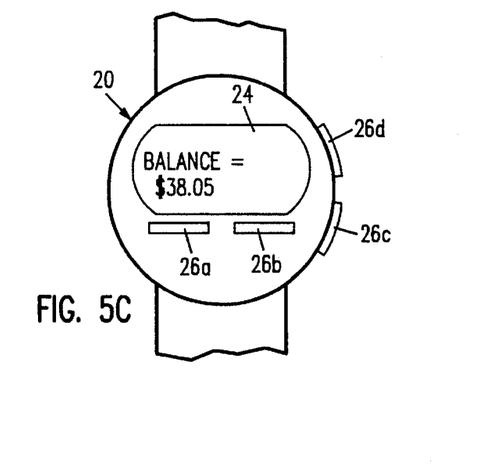

FIGS. 5B and 5C illustrate screen displays relative to partially encrypted paging messages. In FIG. 5b, a message has arrived with a first portion of readable text and a second portion of cryptographic. The meaningful or readable portion reads "BALANCE =", but the remaining cryptographic portion appears meaningless on display 24. The user, seeing the first readable portion, has a basis for selecting among the passwords of table 50. More particularly, the readable portion in the example illustrated in FIG. 5 indicates the message is a bank account balance, and provides a basis for selecting the password in table 50 used to unscramble messages from the bank. FIG. 5C illustrates display 24 following application of a cryptographic function to the cryptographic portion of the message whereby the user may then read the account balance.

Figure 6:
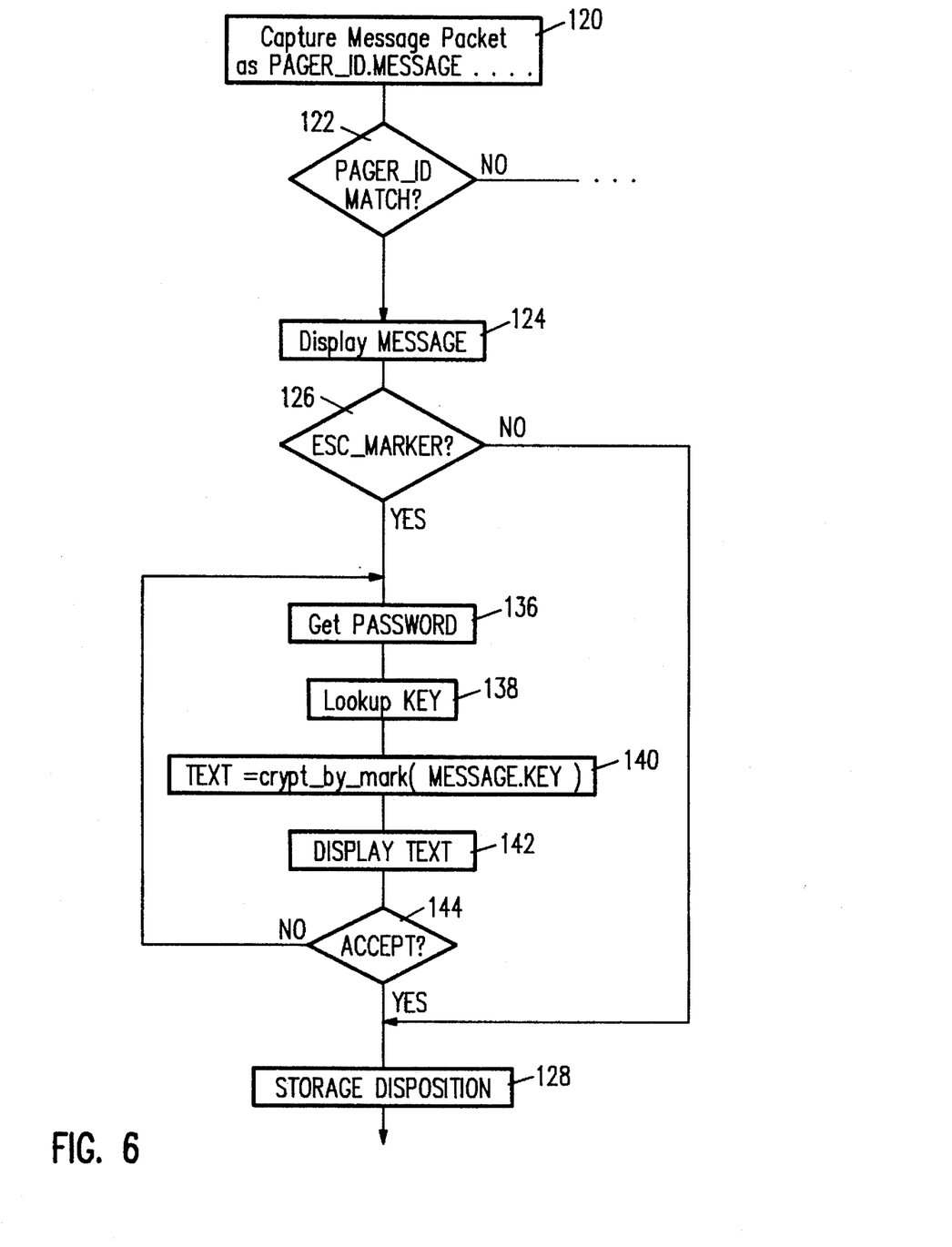
FIG. 6 is a flow chart illustrating programming of the paging device of FIG. 1 relative to partial encryption and decryption of paging message strings.

FIG. 6 illustrates programming of paging device 20 relative to partially encrypted messages. In block 120, a message packet is captured and paging device 20 obtains a PAGER_ID and a message string MESSAGE. After verifying in decision block 122 that PAGER_ID for this particular paging device, the message string is displayed in block 124. The display presented in block 124 may correspond to that of FIG. 5B, i.e., where a portion of the message is cryptographic and appears meaningless on display 24. Paging device 20 then searches the message string in decision block 126 to determine whether an escape marker, designated ESC_MARKER in FIG. 6, exists within the message string. If no escape marker is found in the message string, then processing branches to a storage disposition procedure in block 128.

If, however, an escape marker does exist in the captured message string, paging device 20 obtains in block 136 a password from the user and, in block 138, obtains a cryptographic key from table 50 based on the user provided password. In block 140, paging device 20 generates an alternate version of the captured message string, designated TEXT in FIG. 6, by applying the message string MESSAGE and the key obtained from table 50 to a modified cryptographic function, designated "crypt_by_mark" in FIG. 6. As may be appreciated, the function crypt_by_mark reacts to embedded escape markers by ignoring certain portions of the applied message string and applying the cryptographic function to designated portions of the message string. Continuing to block 142, paging device 20 presents the message string TEXT on display 24. The display remains consistent relative to that presented in block 124 with respect to characters not applied to the cryptographic function of block 140, however, those portions corresponding to cryptographic characters change as a function of the processing of block 140. As may be appreciated, the user may iterate if necessary to select other keys if the display presented in block 142 is meaningless, i.e., might select keys until display 24 appears as represented in FIG. 5C.

Thus, the use of partially encrypted messages provides a user with a basis for selecting among passwords, and therefore keys, of table 50.

Figure 7:
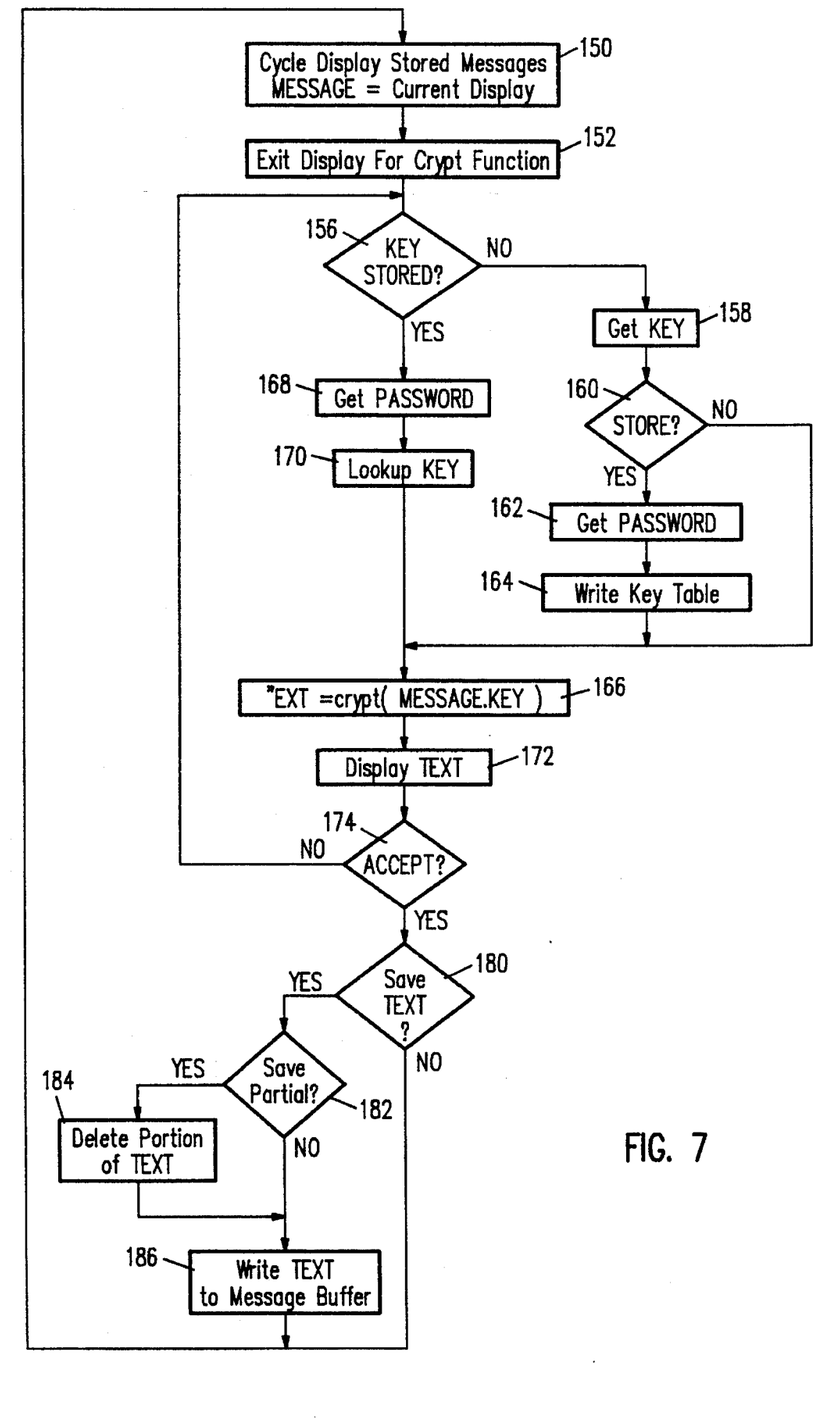
FIG. 7 is a flow chart illustrating programming of the paging device of FIG. 1 relative to message display and selected encryption and decryption of stored paging message strings.

FIG. 7 illustrates programming of paging device 20 relative to stored paging messages, i.e., those messages stored in message buffer 52 (FIG. 1). Generally, the procedure illustrated in FIG. 7 allows the user to cycle through the messages in buffer 52 and, selectively apply a cryptographic function to the currently displayed message.

Thus, block 150 represents a display mode wherein the user can cycle through and display stored messages held in buffer 52. While not specifically illustrated in FIG. 7, it will be understood that processing block 150 includes additional programming, for example, opportunity to exit from the display mode and, other management features relative to messages stored in buffer 52 such as, for example, a delete function relative to messages stored in buffer 52. The programming detailed in FIG. 7 relates to exit from the display mode block 150 for the purpose of applying a cryptographic function to a currently displayed message. Thus, block 152 of FIG. 7 represents exit from block 150 for the purpose of applying a cryptographic function to a currently displayed message. Upon such exit from block 150, a message string MESSAGE carries the value of the currently displayed message. The processing illustrated in FIG. 7 then provides the user with opportunity to generate an alternate version of the currently displayed message, and provides the user with options regarding storage disposition of the newly created alternate version.

In decision block 156, the user has opportunity to enter a new cryptographic key, if necessary, into table 50. If the user intends to apply a key not presently stored in paging device 20, then processing branches to block 158 where paging device 20 obtains a cryptographic key from the user. In decision block 160, the user has opportunity to store the just entered key in table 50. If the option to store is taken, processing branches through block 162 where paging device 20 obtains from the user a password for association with the just entered cryptographic key. Then, in block 164, paging device 20 writes the just entered key and just entered password into table 50 in association for later reference. In any event, the key entered in block 158 is made available for application to a cryptographic function in block 166.

If, however, the user indicates at decision block 156 that the key to be used is already stored in table 50, then processing branches from decision block 156 to block 168 where the user provides a password, and continues to block 170 where paging device 20 obtains a cryptographic key from table to as a function of the password provided in block 168.

Continuing to block 166, a string TEXT is obtained by applying the captured message string and designated key, whether taken from table 50 or obtained in block 158, to a cryptographic function. Continuing to block 172, the string TEXT obtained in block 166 is presented on display 24. In block 174, the user has opportunity to accept or decline the string TEXT displayed in block 172. If unacceptable, processing returns to block 156 where the user has opportunity to select another cryptographic key. If acceptable, however, processing branches from decision block 174 to a storage disposition option in decision block 180. If the user declines to save the text version in block 180, then processing returns to block 150 for continued cyclic display of messages stored in buffer 52. If, however, the user wishes to store the newly created message string TEXT, then processing advances to block 182 where the user first has opportunity to delete a portion of the newly created string TEXT prior to storage. If the user wishes to delete a portion of the newly created string TEXT, then processing passes through block 184 where, by appropriate user interface, the user designates a portion of the string TEXT to be deleted and paging device 20 deletes such portion from TEXT. Continuing to block 186, TEXT is stored in message buffer 52 and processing returns to block 150.

Thus, the programming illustrated in FIG. 7 allows a user to apply a cryptographic function to stored messages and then store the result. Such messages can include previously encrypted messages or messages originally received as plaintext. As may be appreciated, the ability to delete messages stored in buffer 52, i.e., as by in processing in block 150, and the ability to excise portions of stored messages as provided in the processing of block 184, allows the user to manage information stored in the paging device 20, i.e., either delete completely delete partially, or apply a cryptographic function to prevent review by unauthorized persons somehow gaining access to paging device 20.

The programming illustrated in FIGS. 3, 4, and 6 include storage disposition blocks 68, 92, and 128, respectively. While such storage disposition options make take a variety of forms, the programming of FIG. 8 illustrates a preferred form of such storage disposition options where the user of paging device 20 has opportunity to delete a recently received message, store the recently received message in its original form, store the recently received message in its text form, or save a portion of either the original message or the text version of the original message.

Figure 8:
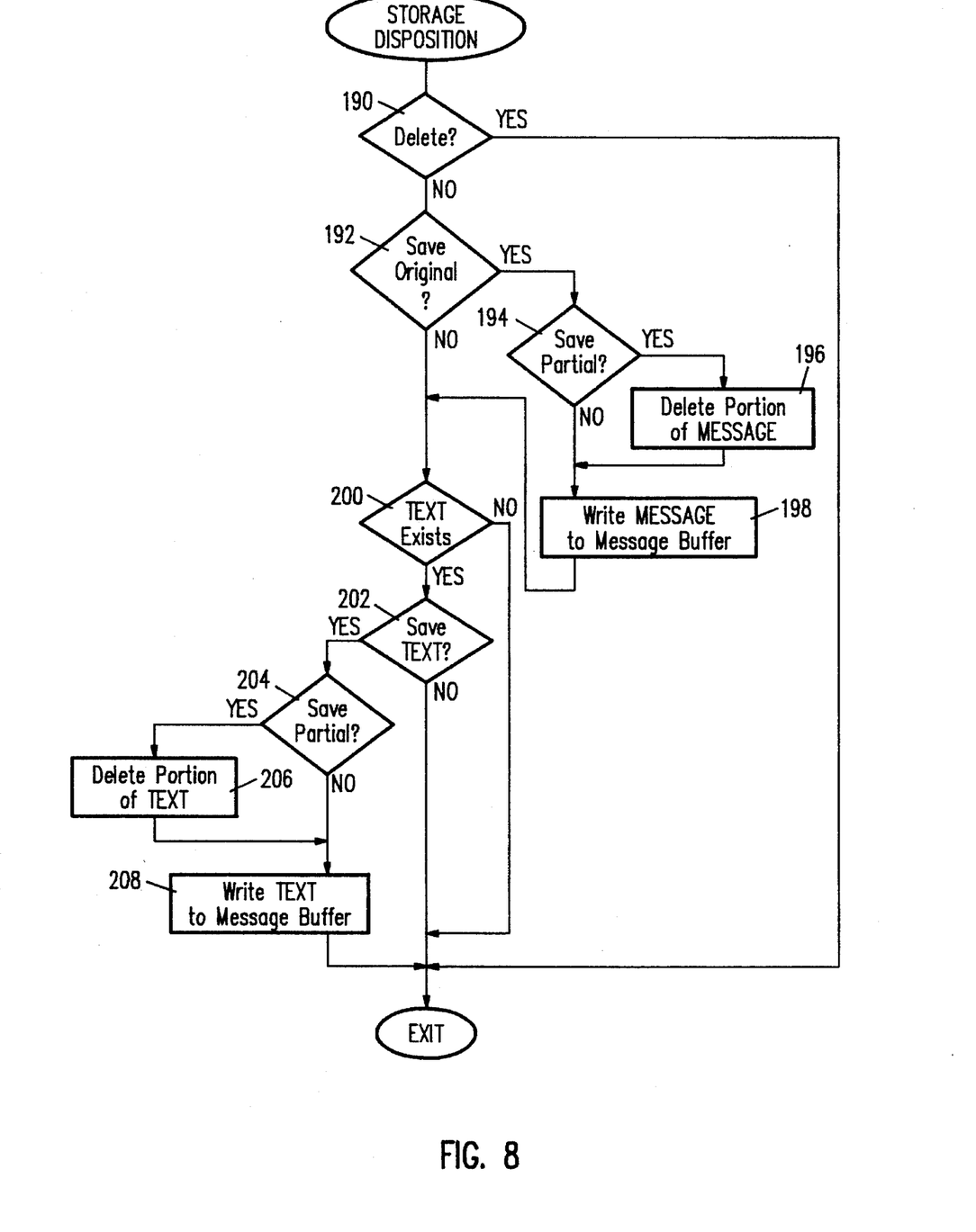
FIG. 8 illustrates processing in the paging device of FIG. 1 relative to storage disposition of newly received messages.

In FIG. 8, processing begins in decision block 190 where the user has opportunity to merely abandon, i.e., delete, a recently received and reviewed, and possibly decrypted, message. If the user decides to abandon the newly arrived message, then processing merely exits at decision block 90 with no copy of the message placed in message buffer 52. If, however, the user wishes to save the newly arrived message in some form, then in block 192 the user selects an option to save the original message as received. In such case, processing advances to decision block 194 where the user has opportunity to delete in block 196 a portion of the original message. In any event, processing reaches block 198 where the original message, possibly as partially deleted in block 196, is written to the message buffer 52. Following block 198, processing returns to decision block 200 where paging device 20 determines whether a text version of a message exists. If no text version exists, then processing exits at decision block 200. If, however, a text version exists, then the user has an opportunity in decision block 202 to save the text version. If the opportunity is declined, then processing exits decision block 202. If, however, the user wishes to store the text version, then in decision block 204 the user has opportunity to delete in block 206 a portion of the text version. Then, in block 208 the text version, possibly as partially deleted by processing in block 206, is written to message buffer 52 and processing exits from block 208.

Thus, newly arrived messages may be selectively decrypted and selectively stored either fully or partially in their original form or in their text form within paging device 20 according to user control.

Figure 9:
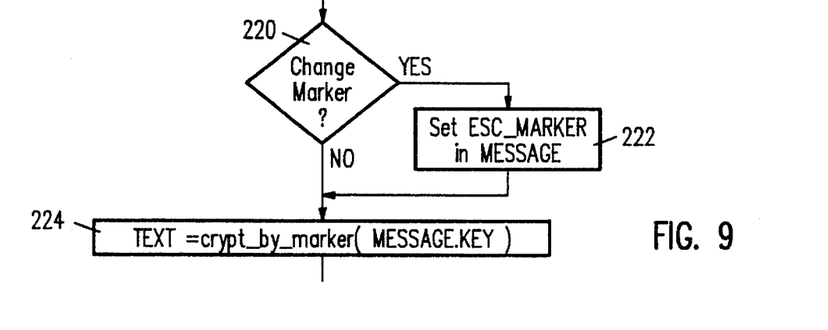
FIG. 9 illustrates a modification relative to the processing of FIG. 7 providing an escape sequence feature with respect to a cryptographic function.

FIG. 9 illustrates a modification to selective decryption when an escape sequence marker is used. In particular, programming in FIG. 9 can replace block 166 of FIG. 7 when an escape marker is used. In FIG. 9, decision block 220 provides the user opportunity to establish or move the escape sequence marker. For example, the user may wish to mask a readable portion of a message to prevent others from having a clue as to message content, i.e., mask the "BALANCE =" portion so the message may not be taken as a bank account message by an adversary gaining access to paging device 20. Thus, in block 222 the user, by appropriate user interface of paging device 20, can modify the position of the escape marker in the message string. In block 224, the function "crypt_by_marker" is used to create an alternate version of the message string, designated TEXT in FIG. 9, by application of the message string MESSAGE and a designated cryptographic key.

While the present invention should not be limited to a specific cryptographic algorithm, it is suggested that a simple exclusive OR function executed on a bit-by-bit basis be employed. While this form of encryption and decryption generally requires a cryptographic key as long as the message for good security, the present invention advantageously allows use of very long cryptographic keys without undue hardship, i.e., without difficulty in user interface relative to manipulation or entry of long keys. Also, the exclusive OR function is a simple algorithm easily implemented in the miniaturized paging device 20. Such algorithm may be applied for both encryption and decryption of messages reciprocally using the same key for either process.

Figure 10:
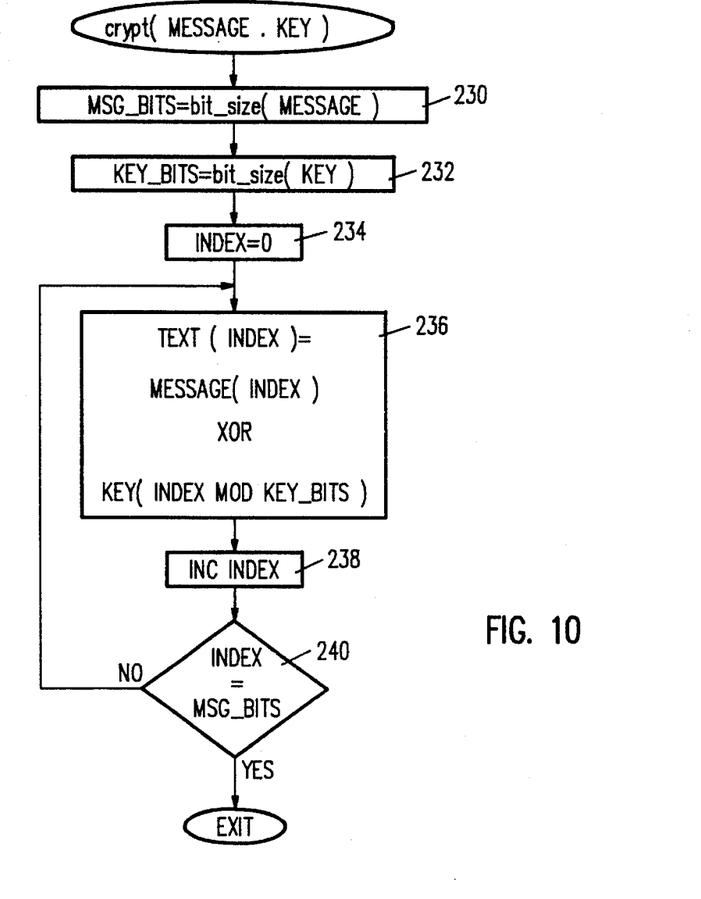
FIG. 10 illustrates a proposed cryptographic function to be implemented in the paging device of FIG. 1.

FIG. 10 illustrates a suggested exclusive OR encryption and decryption function. Generally, the algorithm of FIG. 10 applies an exclusive OR function on a bit-by-bit basis for the parameters provided, i.e., the message string and designated key. Also, the algorithm of FIG. 10 accommodates a key shorter than the message string by repeating use of the cryptographic key as necessary to apply the exclusive OR function to all bits of the message string. In FIG. 10, processing begins in block 230 where a variable MSG_BITS is assigned the value of total number of bits in the message string. In block 232, a variable KEY_BITS receives the value of number of bits in the designated key. In block 234, a variable INDEX is set to zero. Continuing to block 236, paging device 20 then applies an exclusive OR function to respective bits of the message string and key, placing the result in the function output string TEXT. As may be appreciated, the variable INDEX appropriately addresses bit positions of the message string and text string. Also, the variable INDEX is applied to address the KEY_BITS modulo the value of variable KEY_BITS. This allows a key having fewer bits then the message string. Continuing to block 238, the variable INDEX is incremented and then compared in block 240 to the variable MSG_BITS. When the variable INDEX equals the variable MSG_BITS, then all bits of the message string have been applied and placed in the string TEXT. Otherwise, processing returns to block 236 for processing of the next bit in the message string. Eventually, all bits in the message string are decrypted against the designated key and placed in the message string TEXT.

As may be appreciated, the function illustrated in FIG. 10 may be modified to provide the function crypt_by_mark to accommodate escape sequence markers in a message string applied thereto. In particular, such modification would include search for embedded escape markers and application of the exclusive OR function only to those portions designated as requiring application to the cryptographic function.

Thus, an improved method and apparatus has been shown and described supporting a high level of security with respect to termination transmitted by radio signal, yet not requiring the user to manipulate correspondingly complex cryptographic keys. Thus, as the radio signal information is exposed to an adversary, it enjoys a high level of security. As the information is made accessible to the user of a paging device, the user enjoys a convenient user interface mechanism specifying relatively long cryptographic keys required under relatively high standards of security. Furthermore, by providing the user with robust message storage disposition and selective application of stored messages to a cryptographic function, the user can manipulate stored information in such manner to secure such information against review in the event of a lost or stolen paging device.

It will be appreciated that the present invention is not restricted to the particular embodiment that has been described and illustrated, and that variations may be made therein without departing from the scope of the invention as found in the appended claims and equivalents thereof.

What is claimed is:

1. A paging device adapted to operate in a paging system which receives a message from a message source and which transmits said message to said paging-device, an improvement comprising the combination of:

message receiving means in said paging device for receiving said transmitted message;

memory storage means in said paging device for holding a plurality of pairs of associated values, each pair including a short password and a long cryptographic key, each short password being short relative to the associated long cryptographic key;

manual entry means in said paging device for enabling manual entry and storage in said storage means of said pairs of short passwords and long cryptographic keys, each particular message received by said receiving means being encrypted in accordance with one of said long cryptographic keys, input means operable upon receipt of a particular message for obtaining from a user of said paging device said short password associated with the long cryptographic key used to encrypt said particular message;

logic means for selecting the long cryptographic key associated with said short password; and transformation logic for applying said long cryptographic key to said message to transform said message to an alternate version of said message, and presenting said alternate version of said message for display.

2. An improvement according to claim 1 wherein said paging device further comprises:

second memory storage for holding a plurality of previously received messages;

a user interface for allowing a user to select a stored message, select a cryptographic key value by providing the associated short password, apply the selected stored message and selected cryptographic key value to said message transformation function, and view the alternate version of said selected stored message.

3. An improvement according to claim 1 wherein said message includes a marker designating a first and a second portion of said message, said first portion to be transformed, said second portion not to be transformed, and said message transformation function provides as a corresponding alternate version an alternate of said first portion and said second portion unaltered.

* * * * *